Aug. 21, 1923.
N. W. CUMMINS
1,465,253
LUBRICATING DEVICE
Filed May 18, 1921
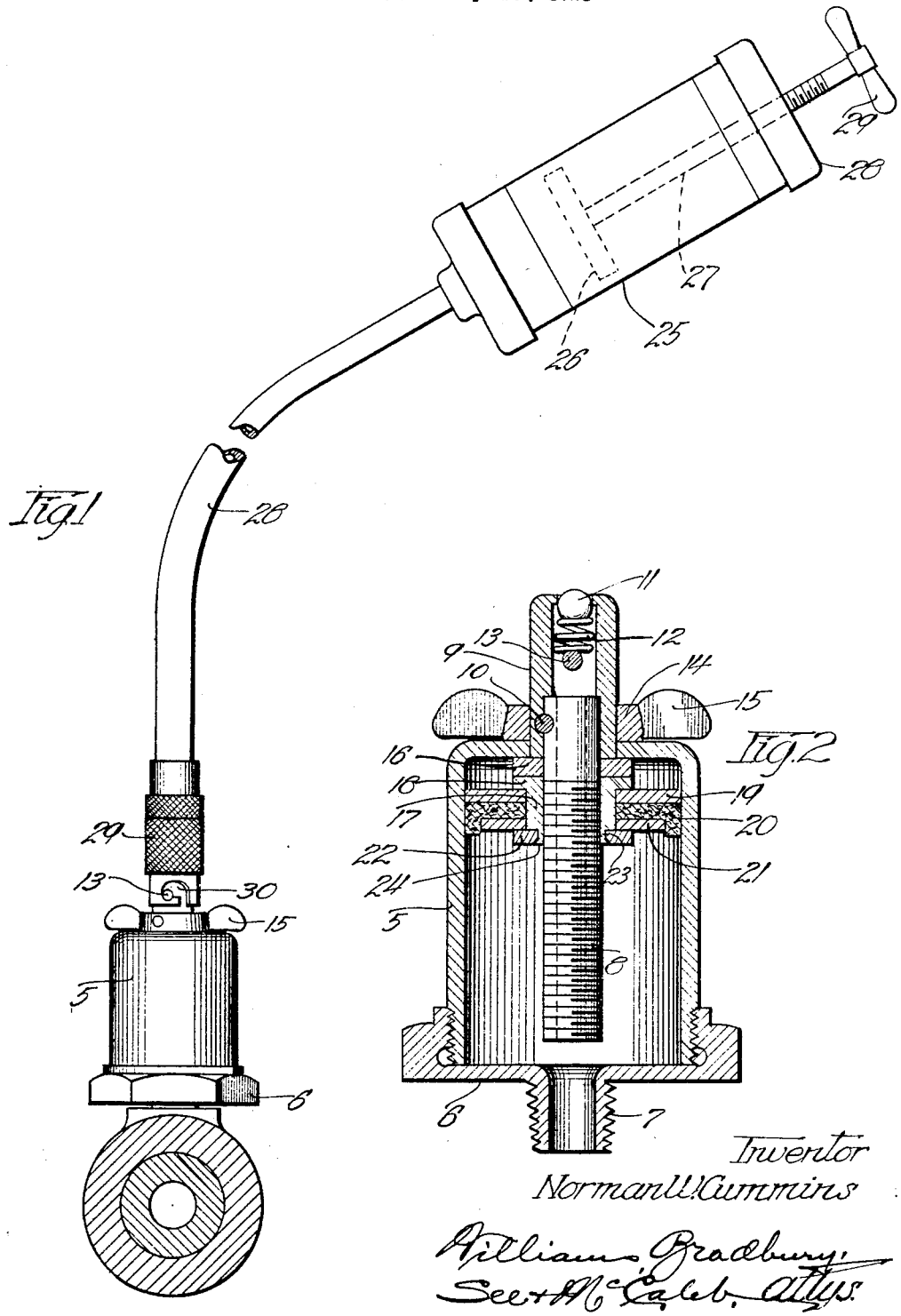
Inventor
Norman W. Cummins Patented Aug. 21, 1923.

1,465,253

UNITED STATES PATENT OFFICE.

NORMAN W. CUMMINS, OF BRIDGEPORT, CONNECTICUT, ASSIGNOR TO THE BASSICK COMPANY, OF BRIDGEPORT, CONNECTICUT, A CORPORATION OF CONNECTICUT.

LUBRICATING DEVICE.

Application filed May 18, 1921. Serial No. 470,709.

*To all whom it may concern:*

Be it known that I, NORMAN W. CUMMINS, a citizen of the United States, and resident of Bridgeport, in the county of Fairfield and State of Connecticut, have invented a certain new and useful Improvement in Lubricating Devices, of which the following is a full, clear, concise, and exact description, reference being had to the accompanying drawings, forming a part of this specification.

My invention relates to improvements in lubricating devices, and is particularly concerned with the provision of a novel device for supplying lubricant to bearings under pressure.

Lubricating systems are now in use which comprise a nipple or fitting to be secured to the bearing to be lubricated and a lubricant compressor for supplying lubricant to the nipple, the nipple and the compressor being provided with co-acting means whereby the discharge conduit of the lubricant compressor can be detachably secured to the nipple. The nipple includes a non-return valve for preventing the escape of lubricant from the nipple.

One of the objects of my invention is to provide in a system of the character described a lubricant receptacle comprising means for making a detachable connection with a lubricant compressor for the purpose of filling the receptacle and initially supplying lubricant to the bearing under high pressure, and other means whereby additional quantities of lubricant can be supplied to the bearing under pressure without the necessity of employing a lubricant compressor for exerting pressure upon the lubricant in the receptacle.

Another object of my invention is to provide a lubricant receptacle which can be easily and quickly filled with lubricant, and, finally, the object of my invention is to provide a lubricating device of the character described which is simple in construction and rugged and easy to operate.

Other objects will appear as this description progresses, reference being had to the accompanying drawing, in which—

Figure 1 is a side elevation of my improved lubricating device which is illustrated as being connected with a bearing shown in section. I have in this figure illustrated one form of lubricant compressor which can be used in connection with my lubricating device; and Fig. 2 is a central longitudinal section through my improved lubricating device.

Throughout both views similar reference characters will be used to describe similar parts.

My improved lubricating device comprises an inverted cup-shaped receptacle 5, one end of which is closed by the cap 6 which is threaded upon the end of the cup 5 and has a threaded discharge outlet 7 by means of which it can be secured to the bearing to be lubricated. A threaded tube 8 projects through the end of the cup 5 opposite the cap 6 and has a tubular nipple 9 secured thereto by means of the pin 10, or in any other suitable manner. The nipple 9 is provided at its outer end with a check valve 11 which is held against its seat by the spring 12, the inner end of which rests upon a pin 13 extending through the nipple and from both sides thereof for a purpose to be referred to later on. A thumb nut 14 having the wings 15 surrounds and is rigidly secured to the nipple 9 and forms an abutment preventing the inward movement of the tube 8. The collar 16 surrounding the tube 8 on the side of the end of the cup opposite the wing nut 14 prevents outward movement of the tube 8.

A sleeve 17 is threaded upon the tube 8 and has a flange 18 extending from one end thereof which acts as an abutment for the follower plate 19, the cup leather 20 and the face plate 21. The follower plate, cup leather 20 and face plate 21 are held in assembled relation upon the sleeve 17 by means of a washer 22. The washer 22 is held in place by swaging over the reduced end portion 23 of the sleeve 17, as shown at 24.

For filling my improved lubricant receptacle I prefer to use a lubricant compressor similar to that shown in Figure 1, which comprises a barrel 25 in which is slidably mounted the plunger 26 which is secured to one end of the rod 27 which is threaded into a cap 28 and provided at its outer end with a handle 29 by means of which it can be rotated to advance the plunger 26 into the barrel and force the lubricant therefrom under high pressure, through the flexible conduit 28. The free end of the conduit 28 is provided with a coupling member 29 having a pair of oppositely disposed bayonet slots 30 which co-act with the projecting ends of the pin 13 to detachably secure the coupling 29 to the nipple 9. The coupling 29 comprises means for establishing a fluid tight connection with the nipple, but since these means are well known to those skilled in this art a detailed description thereof is unnecessary.

When it is desired to supply a bearing with lubricant by means of my improved device, the thumb nut 15 is rotated in a proper direction to move the plunger formed by the sleeve 17, the follower plate 19, cup leather 20 and face plate 21 to the position shown in Fig. 2, the coupling 29 of the lubricant compressor is then secured to the nipple 9 and the compressor actuated to force lubricant into the receptacle 5. At first the resistance of the bearing will cause the lubricant to fill the receptacle 5, after which it is possible, by exerting still further pressure upon the lubricant in the compressor, to force the lubricant into the bearing under exceedingly high pressure, thereby dislodging the used lubricant from the bearing and flushing it with fresh lubricant. The lubricant compressor can then be detached from the nipple 9 and thereafter when it is desired to supply additional lubricant to the bearing this can be accomplished by merely turning the wing nut 15 in a proper direction to move the plunger in the receptacle 5 toward the discharge outlet. After the bearing has once been thoroughly flushed with new lubricant it will not for sometime thereafter require great pressure to supply it with additional lubricant and sufficient pressure can be exerted upon the lubricant in the receptacle 5 by merely turning the wing nut 15.
While I have described the details of construction of the preferred embodiment of my invention, my invention is not to be limited to these details but is capable of other adaptations and modifications within the scope of the appended claims.

Having thus described my invention, what I claim is:

1. A lubricating device comprising a receptacle having an outlet opening in one end, a tube rotatably mounted in the other end, the inner end of said tube being screw-threaded and opening adjacent said outlet opening, a plunger threaded upon the inner end of said tube and having frictional engagement with the inner wall of said receptacle, an inwardly opening check valve in the outer end of said tube, the outer end of said tube being provided with means for making a detchable connection with a lubricant compressor, and means on the outer end of said tube whereby it can be rotated.

2. A lubricating device comprising a receptacle having an outlet opening in one end, a tube rotatably mounted in the other end, the inner end of said tube being screw-threaded and opening adjacent said outlet opening, a plunger threaded upon the inner end of said tube and having frictional engagement with the inner wall of said receptacle, a nipple secured to the outer end of said tube, a check valve in said nipple, means on said nipple for making a detachable connection with a lubricant compressor, and other means on said nipple whereby said tube can be rotated.

3. A lubricating device comprising a receptacle having an outlet opening in one end, a tube rotatably mounted in the other end, a plunger threaded upon the inner end of said tube and having frictional engagement with the inner wall of said receptacle, the inner end of said tube being in communication with said receptacle irrespective of the position of said plunger, an inwardly opening valve in said tube for preventing discharge of lubricant through said tube, means on the outer end of said tube for making a detachable connection with a lubricant compressor, and other means on said tube whereby it can be rotated, said last-named means bearing against the outside of said receptacle to prevent inward longitudinal movement of said tube.

In witness whereof, I hereunto subscribe my name this 25th day of April, 1921.

NORMAN W. CUMMINS.

Witnesses:
 JOHN E. MÜLLER,
 H. T. BRENNAN.